United States Patent
Crockett

(10) Patent No.: US 6,888,942 B2
(45) Date of Patent: May 3, 2005

(54) PROCESS FOR ADMINISTRATING OVER CHANGES TO SERVER-ADMINISTRATED CLIENT RECORDS IN A STATELESS PROTOCOL

(76) Inventor: David A. Crockett, 23803 Lawrence 2140, Marionville, MO (US) 65705

( * ) Notice: Subject to any disclaimer, the term of this patent is extended or adjusted under 35 U.S.C. 154(b) by 872 days.

(21) Appl. No.: 09/726,946

(22) Filed: Nov. 29, 2000

(65) Prior Publication Data

US 2001/0032317 A1 Oct. 18, 2001

Related U.S. Application Data

(60) Provisional application No. 60/168,114, filed on Nov. 30, 1999.

(51) Int. Cl.[7] .............................................. H04N 7/167
(52) U.S. Cl. ...................................... 380/200; 380/201
(58) Field of Search ................................. 380/200, 201

(56) References Cited

U.S. PATENT DOCUMENTS

| | | | | |
|---|---|---|---|---|
| 5,226,161 A | * | 7/1993 | Khoyi et al. ................ 719/316 |
| 5,421,015 A | * | 5/1995 | Khoyi et al. ................ 718/107 |
| 5,517,605 A | * | 5/1996 | Wolf ........................ 707/104.1 |
| 5,961,601 A | | 10/1999 | Iyengar ...................... 709/229 |
| 5,966,705 A | | 10/1999 | Koneru et al. ................. 707/6 |
| 6,115,027 A | | 9/2000 | Hao et al. .................... 345/858 |
| 6,168,563 B1 | | 1/2001 | Brown ........................ 600/301 |
| 6,397,253 B1 | | 5/2002 | Quinlan et al. ............. 709/227 |
| 6,542,902 B2 | | 4/2003 | Dulong et al. ........... 707/104.1 |
| 6,603,494 B1 | | 8/2003 | Banks et al. ................. 345/807 |

OTHER PUBLICATIONS

David Whelan "The Unofficial Cookie FAQ," (Version 2.53 May 10. 1999). http://www.cookiecentral.com/faq/index.shtml.

Luis–Felipe Cabrera. "Operating Systems: Communication." *The Engineering Handbook*, Chapter 133.4, pp. 1451–1452 (CRC/IEEE Press. R.C. Dorf, Ed., 1995).

* cited by examiner

*Primary Examiner*—Thomas R. Peeso
(74) *Attorney, Agent, or Firm*—Jonathan A. Bay

(57) ABSTRACT

A system for administrating over changes to a record shared by a plurality of users authorized to do so is provided with a resource to officiate over an official version of the record and to communicate with the plurality of users over a medium for non-persistent communications. Typically, this medium is the Internet. In response to a request of a given user, the resource replies with a communication sending a copy of the official version. In consequence of a return by the given user of a request to effect given changes, the resource compares a saved original edition of the sent copy to the official version so if in case of a match the resource effects the given changes to the official version, or else not.

13 Claims, 9 Drawing Sheets

PROCESS FOR ADMINISTRATING OVER CHANGES TO SERVER-ADMINISTRATED CLIENT RECORDS IN A STATELESS PROTOCOL

CROSS-REFERENCE TO PROVISIONAL APPLICATION(S)

This application claims the benefit of U.S. Provisional Application No. 60/168,114, filed Nov. 30, 1999.

A portion of the disclosure of this patent document and/or the provisional application(s) that provide a priority basis for this patent document contain(s) material which is subject to copyright protection. The copyright owner(s) has(have) no objection to facsimile reproduction by anyone of the patent document or the patent disclosure, or the matters in the file(s) comprising the prosecution history of this patent document, as any of the foregoing appears with Patent & Trademark Office files or records, but otherwise reserve(s) all copyright rights whatsoever.

BACKGROUND OF THE INVENTION

1. Field of the Invention

The invention generally relates to distributed computer systems and/or networks of interconnected computer systems, and more particularly to a method and system providing an administrative checking process over browser-sent changes to server-administrated records of such browser or client, as transacted in a stateless protocol over such distributed computer systems and/or networks of interconnected computer systems.

2. Prior Art

Computers communicating over the World Wide Web ("web") do so by browser technology and in an environment described as a "stateless" or non-persistent protocol. "Intranet" generally refers to private networks that likewise implement browser technology as does the web. At least in the case of the web, the stateless protocol is denominated as Hypertext Transfer Protocol ("HTTP"). One premise of the web is that all material on the web is formatted in standardized formats as, eg., HTML (Hypertext Format Language) or XML and so on. All information requests and responses conform similarly to a standard protocol. Another premise of the web is that communications vis-a-vis requests and responses are non-persistent. A request comprises a discrete communication which when completed over a given channel is broken. The response thereto originates as a wholly separate discrete communication which is likely to find its way to the requestor by a very different channel.

Among the many possible configurations of computers communicating over such stateless network is the case of say, a subscription client and a service bureau. The service bureau is likely to provide a domain of one or more distributed servers featuring specialized application programs (eg., records administration, calendaring, accounting and so on) as well as administration over or access to distributed memory (eg., database storage) for trustworthy storage of the records/data. The service bureau might specialize in a given field, say administration of healthcare records and accounts. A subscription client to such a service bureau is paying or somehow otherwise remunerating the service bureau for multiple services. These services include access to the server-based application programs, the presumably powerful platforms which execute such application programs, as well as the server-administrated storage of the client's (probably) voluminous records and data, and back-up and maintenance and upgrades and so on. Individual users of a given client group may have machines no more powerful than routine personal desktop or laptop computers. By accessing the service bureau, the client group obtains the benefit of computing and data-storage power far in excess of their own machines.

One problem with stateless protocols (eg., non-persistent communicating) involves the amending of a server-administrated record. A way of illustrating the problem in a stateless or non-persistent protocol is by reviewing a persistent protocol paradigm:—eg., a private data network. So for example, consider a bank and the bank account information it administrates for its customers. This bank might provide a market or region with a number of different branches. The branches feature tellers who service the transactions of the customers by interacting with a computer at the given teller station. The teller-computers are linked (most likely) by copper wire to the bank's central server. Assume that a given customer account might have multiple parties or members of the customer group. For example, a customer group might comprise a parent and a child. Such two members are privileged to deposit or withdraw at will and independently.

The following example is characterized as both an example of ● a persistent protocol in which the server-administrated record (eg., bank account) is ●● "locked" during a given node's (eg., teller's) session with it. Therefore, in a teller transaction utilizing a persistent protocol, a teller who is servicing one member of the customer group forms a persistent connection with the server by accessing the customer account through the teller-machine. The teller is "online" continuously with the server. During the session that the teller is accessing the customer account, the teller is online continuously with that customer's account information. That is, the teller never goes away from its connection with the customer's account until the teller signals the completion of the transaction, or otherwise breaks off the session with that customer account.

During the session, the server "locks" the bank account record, thus barring intervention by any other member of the given customer group, as vis-a-vis a teller at another branch. Again, the server-administrated bank account record is said to be "locked." During the session that the teller for the given member is interacting with the bank account, the teller is not only "online" continuously, but the interaction is also real-time.

At completion of the session, the teller logs off his or her access of the customer bank account or otherwise breaks the session. The server then "unlocks" the account record for a succeeding transaction. Unlocking the account frees it for access again by any of the members of the customer group for any of their succeeding transactions (again, as through tellers).

Let's say both a parent and a child hold privileges for one bank account. Take as an example the situation when each of the parent and child both wish to withdraw from the account at about the same time and from different branches. In a persistent protocol, things might happen in this sequence. The teller for the first of the two who latches onto the account with the server gets to complete his or her transaction first and to the exclusion of the other because the server "locks" out any teller for other for the duration of the session. After the first of the parent or child completes his or her transaction, the server "unlocks" the account. The second-in-time of the parent and child can then get access to the account, but they find the bank account in the state left by the immediately previous transaction.

Allow us to examine what might happen if the server did not lock the bank account during a teller's session with it. Assume all of the following. That is, that a grandparent, parent and child all hold privileges to a given account, which at beginning of our example, has a balance of $1,000. First, the grandparent steps up before a teller and asks the teller to check the account balance. The grandparent's teller does so, and replies "$1,000." Elsewhere, the parent steps up before another teller and asks that teller to check the account balance. The parent's teller does so, and replies "$1,000." In still a different place, the child steps up before still a different teller and asks that teller to check the account balance, who does so and replies "$1,000." Hence, all three teller's have called in a copy of the account to their teller-machine.

Now, in the same sequence, the grandparent withdraws $100. The grandparent's teller changes the account in the teller's local copy and then transmits the changed copy to the server. The parent deposits $500. So the parent's teller changes the account in that teller's local copy and then transmits that teller's changed copy to the server. The child withdraws $300, which has the child's teller changing the account in that teller's local copy and then transmits that teller's changed copy to the server. In actuality, the account balance should be $1,100. But since the server-administrated record was not locked, each successive teller overwrote the changes entered by the previous teller. Hence the withdrawal and deposit of the grandparent and parent were both overwritten. Only the child's transaction is recorded, it being the last in time while the three concurrent transactions were transpiring. Thus, in error, the account balance shows as $700.

The foregoing gives a good reason for locking the records in a persistent protocol. With that background in mind, a stateless (non-persistent) protocol such as the web or an Intranet presents problems with client-requested changes to server-administrated client records. In a stateless protocol, a user is only intermittently in contact or "online" with the server. After a given intermittent "online" contact, the server has no knowledge or assurance that the user will come back anytime soon.

Let's examine this again in the context of a bank's server administrating a bank account for a customer group consisting of a parent and a child. Assume that the parent acts first. That is, the parent acts first to establish a connection via the Internet or web with the server that administrates the bank account. The contact of the parent with the server functions (among other ways) as a request for the server to grant said teller the privileges and rights to deposit to or withdraw from the bank account. Unlike the persistent protocol, where the server may next lock the account, in a stateless (non-persistent) protocol it is generally an unwise policy to lock the account. Arguably, it is generally a wiser policy to leave the account unlocked at all times. Indeed, these policy concerns are worthy of further examination.

Once again, in a stateless protocol, it is generally unwise to lock a server-administrated client record, ever. It does not help even if the user signals its intention to change the account in advance such that the server can anticipate that the very next transmission will comprise the actual request to change. Locking the account is simply risky. The nature of a stateless protocol has the user's connection breaking off after every discrete communication. Whereas the server can anticipate that in the majority of cases the user will return after it signals its intention to change the account, there is no guarantee. The minority of cases, when the user doesn't return after signaling its intention to change the account, causes the problems if the account is locked. If the account was locked, and then left locked, it remains so all day, all week, until the server master or customer service department personally attends to unlocking it. That is, the usual way a "locked" and abandoned record gets unlocked is because of a flag noticed at the end of some period of business which is attended to personally by the server's master, unless a client call is placed to the customer service department.

For sake of illustration, consider the parent and child accessing the same account, this time over a network in a stateless protocol environment. Assume that the parent logs on first to the server. The parent requests to make a withdrawal except including the reservation that parent wants to the server to send the account balance first in order that parent not overdraw the account. The server might reply with sending the account balance and simultaneously locking the account in anticipation of the parent's succeeding transmission, which ought to be the request for withdrawal. However, assume now that the parent simply does not respond again and goes away for an extended period of time. The server is left with a locked account. Now the child is unable to access the account. The account won't be unlocked probably until it is given personal attention by the server's master or the customer service department. In the competitive business of providing user-convenient service, this scenario inconveniences not only the child (or successive other users of the client group) but also the service bureau.

Let's reconsider the foregoing with the following change. Assume that, following when the parent logs on and requests to an account balance, this time the server chooses to leave the account unlocked. At this stage in the process, the account is unlocked and the parent's connection, which is always only intermittent in a non-persistent protocol, is disconnected. Hence the parent is studying the downloaded account balance information in order to decide what amount to withdraw. With the record unlocked, the child is free to log onto the server and withdraw from the account before the parent ever returns. The parent's later-transmitted request for withdrawal may be denied for insufficient funds. The confounded parent might request for an updated account balance, which the server sends. And, before the parent can re-submit a reduced-amount request for withdrawal, a second child might get in and out and further deplete the account. The foregoing scenario is hardly a hypothetical posit. In fact, it is such a problem in the industry that it has been given an informal name. That is, in cases where a junior user intervenes in a conversation between an earlier user and server and changes the server-administrated record on the slower moving earlier user, it is called "walking on somebodies toes."

Consequently, a sever faces a dilemma in the administration of server-administrate records for a client group over a stateless (non-persistent) protocol network. On one hand, it is an unwise policy to lock a record for the earliest user. There are multiple reasons why this is unwise, but for which only a very simple example is given above. On the other hand, it is no better a policy to leave the record always unlocked because this affords the opportunity for what is informally getting called "walking on somebodies toes."

What is needed is a solution for server-administrated record administration in a stateless protocol that overcomes the shortcomings of the prior art.

SUMMARY OF THE INVENTION

It is an object of the invention to systematize and/or provide orderliness to changes made to a record shared by a plurality of remote users who contact the record across a non-persistent communications medium.

It is an alternate object of the invention that the above system be implemented for Internet communications.

It is another object of the invention that the system be officiated over by a given resource, such as an Internet server domain, which administrates over the official version of the given record.

It is an additional object of the invention that the above resource practice the system in part by slipping tracking information off onto intermediaries or else into the browsers of those users who are contacting the resource about the state of the record by means of cookies or like strings of transparent or opaque text to be stored by the users or intermediaries.

These and other aspects and objects are provided according to the invention in a system for administrating over changes to a record shared by a plurality of users authorized to do so. The system is implemented by a resource which officiates over an official version of the record and which communicates with the plurality of users over a medium for non-persistent communications. Typically, this communications medium is the Internet. In response to a request of a given user, the resource replies with a communication sending a copy of the official version. In consequence of a return by the given user of a request to effect given changes, the resource compares a saved original edition of the sent copy to the official version so if in case of a match the resource effects the given changes to the official version, or else not. method and system facilitating Optionally, the saved original edition is provided by the following processes. That is, the given user returns both an original edition of the sent copy as well as the request to effect the given changes. The resource compares this returned original edition of the sent copy to the official version for a case of match or not.

Other preferred aspects of the invention include the following. The request to effect given changes comprises a changed edition of the sent copy. That way, the resource effects the given changes to the official version by replacing the official version with the changed edition. Also, the official version of the record is stored optionally on storage devices administrated over or accessible to the resource. The system activity of the resource comparing for a match comprises any of bit-by-bit comparison in full (ie., testing for identity) or in part, or a count-and-sum word comparison, or another algorithm which tests for practical, substantial identity. The system activity of 'else not' further comprises informing the given user of the failure to effect the given changes.

To turn to an alternative mode of the invention, the saved original edition might be provided by the following processes. That is, in response to the original request of the given user, the resource sends the given user a copy of the official version and also stores another copy in storage. This other copy is associated with the given user. Later, the resource retrieves this saved copy when the given user returns the next time with a request to effect changes. Under this mode of the invention, the step of storing said other copy in storage comprises either storing said other copy on a device of the given user's or else on another device including any devices administrated over or accessible to the resource. The resource may optionally convert this other copy into a changed format before storing in storage, including any of count-and-sum word values or abbreviated formats. If so, the step of the resource comparing the stored copy associated with the given user to the official version comprises either the resource re-storing the stored copy from the changed format or converting a copy of the official version into the changed format.

A further mode of the invention might have the saved original edition provided by the following processes. That is, going back to the original request of the given user, the resource might send the given user a use copy of the official version as well as a transparent or opaque copy. The given user would preferably accept both the use and the transparent or opaque copies of the official version. If the given user thereafter applies to change the official version, it would do so by returning the transparent or opaque copy of the official version as well as a request to effect changes. The resource would extract the saved original edition from the transparent or opaque copy of the official version. Under this mode, the step of accepting the transparent or opaque copy of the official version comprises the given user accepting a cookie. That is, the cookie being opaque text contained in the header portion of a communications transport packet that has to be accepted by the given user's browser.

On the server side, the resource might convert this transparent or opaque copy of the official version into a changed format before sending. The changed format can include any of count-and-sum word values or encrypted or abbreviated formats. If so, the step of the resource comparing the returned transparent or opaque copy of the official version comprises either the resource re-storing the returned transparent or opaque copy of the official version from the changed format or converting a copy of the official version into the changed format.

In accordance with most of the foregoing aspects of the invention, the various activities of the resource are preferably fulfilled by a server domain on the Internet global computer information network.

Additional aspects and objects of the invention will be apparent in connection with the discussion further below of preferred embodiments and examples.

BRIEF DESCRIPTION OF THE DRAWINGS

There are shown in the drawings certain exemplary embodiments of the screens for software in accordance with the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
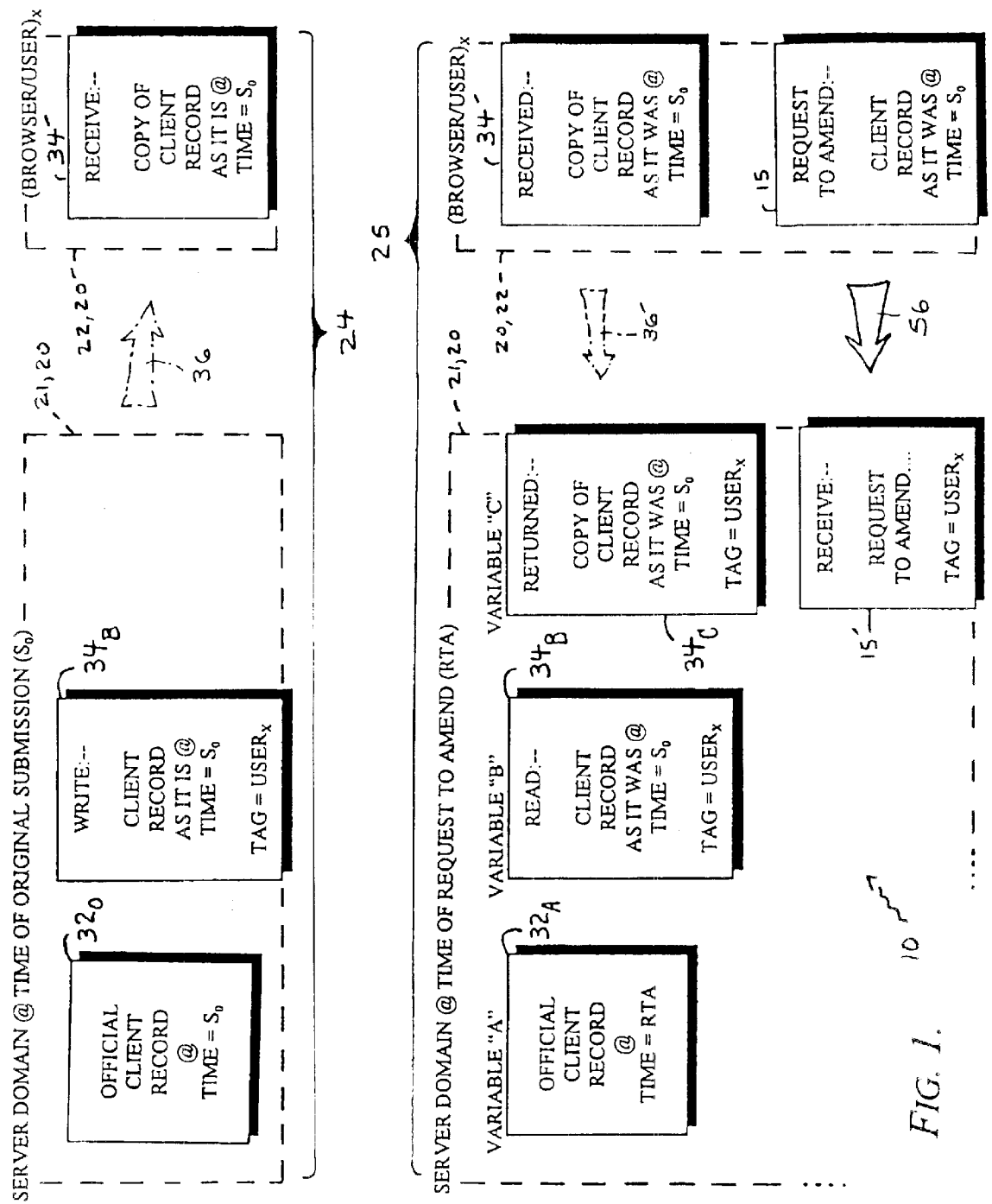
FIG. 1 is a schematic block diagram of an administrative process in accordance with the invention for the administration over server-administrated client records in a stateless protocol.

FIG. 1 provides a schematic depiction of an administrative process 10 in accordance with the invention, for assuring administrative integrity with or orderliness among client-ordered edits 15 to server-administrated records 32 over a network operating by a "stateless" (non-persistent) protocol. By way of background, example major networks which operate in accordance with a stateless protocol include the Internet and its World Wide Web ("web") as well as Intranet private networks employing browser technology. In a stateless protocol, each connection 24–25 between communicating parties 20, say a server domain 21 and a user 22, is only an intermittent connection 24 or 25. Each connection 24 or 25 is non-persistent and it breaks off at the completion of the transmission. Every successive connection 25 and so on may be routed across a wholly different channel across the network grid.

As a brief background in terminology, the term "server" is used fairly consistently as an abbreviation of server domain. A server domain may comprise one or more server machines cooperating as a unitary server domain. Also, the term "client" is most often used in such context that ordinarily it refers to a group which comprises individual users. The term "browser" is a software package on a user's machine that interacts with server communications and/or server pages.

It should be noted that a given user's machine may accommodate more than one user. Hence a given machine or network-node in communication with a server is most accurately identified as a browser/user pair. However, for the sake of brevity, this written description often assumes that a given user is communicating from a unique machine and browser package. But again, actual operating systems including WINDOWS 95/98® accommodate multiple user profiles on one machine.

FIG. 1 shows two separate instances of connection 24 and 25 between a server domain 21 and a user 22. The connection 24 of the upper set of dashed-line blocks 21 and 22 comprises a submission (eg., 24) from the server 21 to the user 22 occurring at an arbitrary time denominated "time of original submission," or else "$S_O$." The connection 25 of the lower set of dashed-line blocks 21 and 22 comprises a transmission (eg., 25) from the user 22 to the server 21, the content of which includes a "Request to Amend" 15 a given record 32 within the server domain 21. This second connection 25 occurs at some arbitrary later time denominated "time of request to amend," or else "time=RTA."

In this simplified schematic, the server 21 provides administration over or access to computer-implemented memory for the given client's record 32. This record 32 is termed the "official client record" in the drawings. One of the responsibilities of the server 21 is to track the orderliness of changes made to this record 32. Generally, the members of the relevant client group (eg., one of whom is user$_x$22) are granted privileges with respect to the record 32, including in some instances the privilege to edit the record 32 by means of instructions transmitted over a stateless protocol connection as 25. The administrative process 10 in accordance with the invention handles portions of this responsibility in the following way.

In FIG. 1, it is assumed as matter of proximate history that the user/member 22 of its relevant client group has established some previous connection with the server 21. Also, the user 22, "users$_x$," has some way signaled to the server 21 its intentions to change the record 32 (or else the server 21 has somehow deduced that the user 22 is likely to request permission to amend the record 32). So as an original matter, the server 21 initiates the process 10 in accordance with the invention by creating various sets of copies 34 of the record 32 in order to preserve the edition $32_O$ of the record 32 as it exists at the time of original submission, or $S_O$. One copy $34_B$ of the $S_O$-edition $32_O$ of the record is written to server-administrated or -accessible memory. At least one other copy 34' of the $S_O$-edition $32_O$ is created and submitted to the user 22. This at least one other copy 34' is submitted preferably in a "transparent" and/or "opaque" way 36 to the user. More particularly, one such "transparent" and/or "opaque" way of submitting the at least one other copy 34' of the $S_O$-edition $32_O$ is, preferably, by means of a "cookie" 36.

"Cookie" is a term of art which will be more particularly described below. For present purposes it is sufficient to be informed of the following basics. A cookie is an instrument of a web site. A user's connection to a web site allows the web site to cause the setting of a cookie in the user/browser's RAM (provided that the user's browser is set to accept the cookie). The browser might cause the even more persistent saving of the cookie to a directory or folder. Put differently, a cookie is a text file stored on a user's machine in RAM while the browser is running, and saved in a directory or folder of the user's machine upon the closing of the browser program. In most instances, not only does the setting or storage of the cookie go unnoticed, so does access to it. Web sites automatically gain access to their relevant cookies once the user establishes a connection to them.

Cookies are based on a two-stage process. First, a web server creates or causes creation of a specific cookie for a given user and stores the cookie on the user's machine most often without the user's immediate consent or knowledge. The cookie is essentially a tagged string of text, including perhaps scripted or encrypted binary data, which data may contain all manner of information. The original plan for cookies was to have the browser save user ID's and passwords for specific web sites, if not also preferences for personal start pages. Also, online shopping sites use cookies to store a user's shopping cart choices so that this information is not lost on the pre-mature closing of the browser program. A user could return days if not weeks later and still have the shopping cart contents saved in his or her cookie. Regardless, a user's browser, if cookie-savvy, accepts the cookie and saves it in a special folder or file called a cookie list. All this happens without the user's notification or consent. As a result, a web server can format all kinds of personal information about the user in a cookie, and then save this cookie on the user's computer.

During the second stage of the cookie process, the cookie is clandestinely and automatically transferred from the user's machine to the relevant web server. Whenever a given user directs his or her browser to display a page from a server, the browser will, without the user's knowledge, transmit the cookie containing the personal information to the web server.

With that background, renewed reference to FIG. 1 may be interpreted as showing that the server 21 at time $S_0$ causes the setting of one or more cookies 36 with the user's browser 22. Presumably, the cookie or cookies 36 contain(s) a copy 34' of the $S_0$-edition $32_0$ of the client record 32. Therefore, in review, the server 21 has created at least two copies $34_B$ and 34' of the $S_0$-edition $32_0$ of the official record 32. One copy $34_B$ of the $S_0$-edition $32_0$ is saved to memory administrated over or accessible by the server 21. The at least one other copy 34' is saved with the user's browser 22 and/or machine, as preferably transported there by means of a cookie 36.

Indeed, the server 21 may create and serve an additional copy (not shown) of the $S_0$-edition $32_0$ of the client record 32, it being accessible to the user 22 in the format of the main web page being submitted to the user 22 (again, this is not shown).

In accordance with inventive administrative process 10, the conversation between the server 21 and user 22 terminating with connection 24 remains in suspension until the user 22 next contacts the server, as by connection 25. Presumptively, the user 22 submits a "request to amend" 15 to the server 21. This successive connection 25 is shown by the lower set of dashed-line boxes 21 and 22. The time of this connection 25 is designated as the time of the "request to amend," or "RTA." At this time, the server 21 is in possession of at least four (4) relevant quantities $32_A$, $34_B$, $34_C$ and 15'. The server 21 has on hand the then current edition of the Official client record $32_A$ (designated variable "A"), the copy $34_B$ of the $S_0$ edition $32_0$ of the client record 32 as retrieved from memory administrated over or accessible to the server (designated variable "B"), and also the copy $34_C$ of the $S_0$-edition $32_0$ of the client record 32 as returned in the user 22's cookie 36' (designated variable "C"). The fourth quantity is the received "request to amend" 15' itself.

Figure 2:
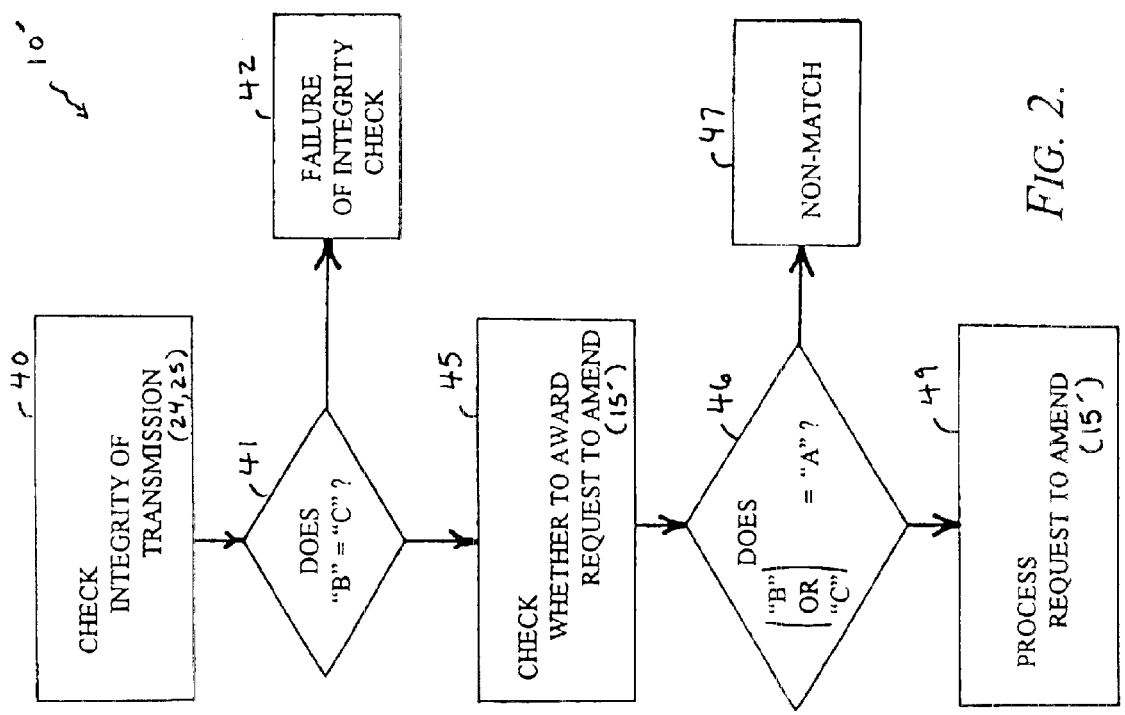
FIG. 2 is a flow chart of the administrative process in accordance with the invention, which flow chart references the variables "A," "B" and "C" that are shown by FIG. 1.

FIG. 2 shows the algorithm 10' in accordance with inventive administrative process 10. As a preliminary matter, the process 10 checks the integrity of the connections 24 and 25 (eg., box 40). To do this, the process 10 compares variable B with variable C (eg., box 41). If there is not an exact match, then there was a failure in the transmissions 24 and/or 25 (eg., box 42). In cases of such failure 42, the server 21 might poll the user 22 for its intention to re-start the process. On the other hand, if C successfully corresponds to B, then the process 10 steps on to the next relevant comparison, which determines whether to process the "request to amend" (eg., box 45).

In this second comparison (eg., box 46), the process 10 compares whether the copy $34_C$ of $S_0$-edition $32_0$ returned by the user's cookie 36' (eg., variable C) matches the then current edition $32_A$ of the official client record (eg., variable A). Alternatively, the comparison 46 can substitute variable B for variable C because variables B and C ought to have been previously established (eg., in box 41) as corresponding with one another. Regardless, this second comparison 46 seeks to determine if the returned copy $34_C$ of the $S_0$-edition of the client record 32 (which is, more accurately, variable C) matches the then current edition $32_A$ (ie., variable A). If no match (eg., box 47), than what has likely happened is that another member of the client group has intervened and changed the record ahead of the given user 22 in FIG. 1 (eg., "user$_x$.").

An inventive aspect of this administrative process 10 is that, the process 10 leaves the record 32 unlocked. It is entirely foreseeable that in some cases one member of the relevant client group is going to change the record 32 ahead of the another member. Such other member no doubt may be surprised by that fact. But the server 21 will inform that such other member and hence properly track the orderliness of changes made to the record 32.

Thus, in cases of no match 47, the server 21 steps through a given instruction set such as:—● informing the FIG. 1 user 22 of non-match 47, and ● perhaps polling the user 22 if the user 22 wishes to re-study the changed record $32_A$ to decide if to re-submit an updated request to amend (no updated request is shown). If the user 22 would chose to do so, then the inventive administrative process 10 would restart from the beginning. That is, the process 10 would restart from the top of FIG. 1 by sending a copy of the then current version of the official client record in a cookie, which will be utilized for a further instance of administrative checking as shown by FIG. 2, if and when the user ever sends a successive "request to amend."

On the other hand, in cases of a match (eg., box 49 in FIG. 2), the "request to amend" 15' is simply processed.

The foregoing description suffices as an overview of the administrative process 10 in accordance with the invention. In brief review, the inventive process 10 comprises the following steps. The server 21 is configured such that—in at least one submission 24 to the user 22 preceding a user 22's transmission 25 of a "request to amend" 15' instruction—the server 21 passes to the user 22's machine a copy 34' of the record 34 in the record 32's then current edition $32_0$ at the time of this given submission (eg., time="$S_0$"). The copy 34' of the $S_0$-edition of the record 32 is preferably scripted or encrypted and/or set in such a way that the user 22 cannot practicably edit or hack the copy 34' set on his or her machine. Now looking at transmission 25, the server 21 extracts the returned copy $34_C$ of the $S_0$-edition $32_0$ of the record 32 which accompanies the incoming "request to amend" 15', both to check the integrity of transmissions 24 and 25 as well as to check whether the official client record 32A remains in the $S_0$-edition $32_0$.

Two premises are implicit here. One premise is that the server 21 can anticipate an incoming "request to amend" 15' instruction. Another premise is that the server 21 can successfully set a copy 34' of the $S_0$-edition $32_0$ of the record 32 on the user 22's machine in such a scripted or encrypted way that the user 22 cannot practicably edit or hack the copy 34'.

In consideration of the first premise, the server 21 is afforded several options to anticipate an incoming "request to amend" 15' instruction. For example, one non-limiting way to achieve this may be the following. The server may operate under a set of rules such that server-administrated client records (eg., 32) can only be amended after a user 22 has called up a given server page. Hence a server 21 can be configured such that, before a user 22 can submit a "request to amend" 15, such user 22 must beforehand submit a request for the relevant server page as well as identify the target record the user is intending to amend (this is not illustrated). That way the server 21, upon submission of that page, can also set an administrative-checking token, marker or text string on the user 22's machine.

The second above-mentioned premise will be recalled as that, the copy 34' of the $S_0$-edition $32_0$ of the record 32 ought to be set in the user 22's machine in such a format that is safe from editing, hacking or tampering by the user. In examining ways to practice this second premise, understanding the policy behind it is helpful. The server 21 wants to eliminate all users (eg., one of which is 22) from subverting the administrative checking process 10. The server 21 ensures security to its customers, including the client group which user 22 belongs, by establishing a set of security procedures including the process 10 governing the ways in which an authorized user (eg., 22) is allowed to make changes to a record (eg., 32). If this process 10 depends in part on the set copy 34' of the $S_0$-edition $32_0$ of the record 32 not being tampered with, it is a reasonable responsibility of the server 21 to script or encrypt the set copy 34' by as undecipherable means as practicable. That way, the client group as a community can be assured that no one member (eg., 22) will likely posses sufficient hacking skill to alter the copy 34' in ways which will fool the server 21 (nullifying or inserting gibberish in the copy 34' does not fool the server 21). Thus the administrative checking process 10 is protected from unauthorized subversion, and for the comfort and trust of the client group(s) as a community.

A way of accomplishing the objects of the invention include the non-limiting way of transporting the administrative-checking token or marker 34' in a cookie (eg., 36). A review follows of what a "cookie" is and what are is its possibilities and limitations.

Figure 3:
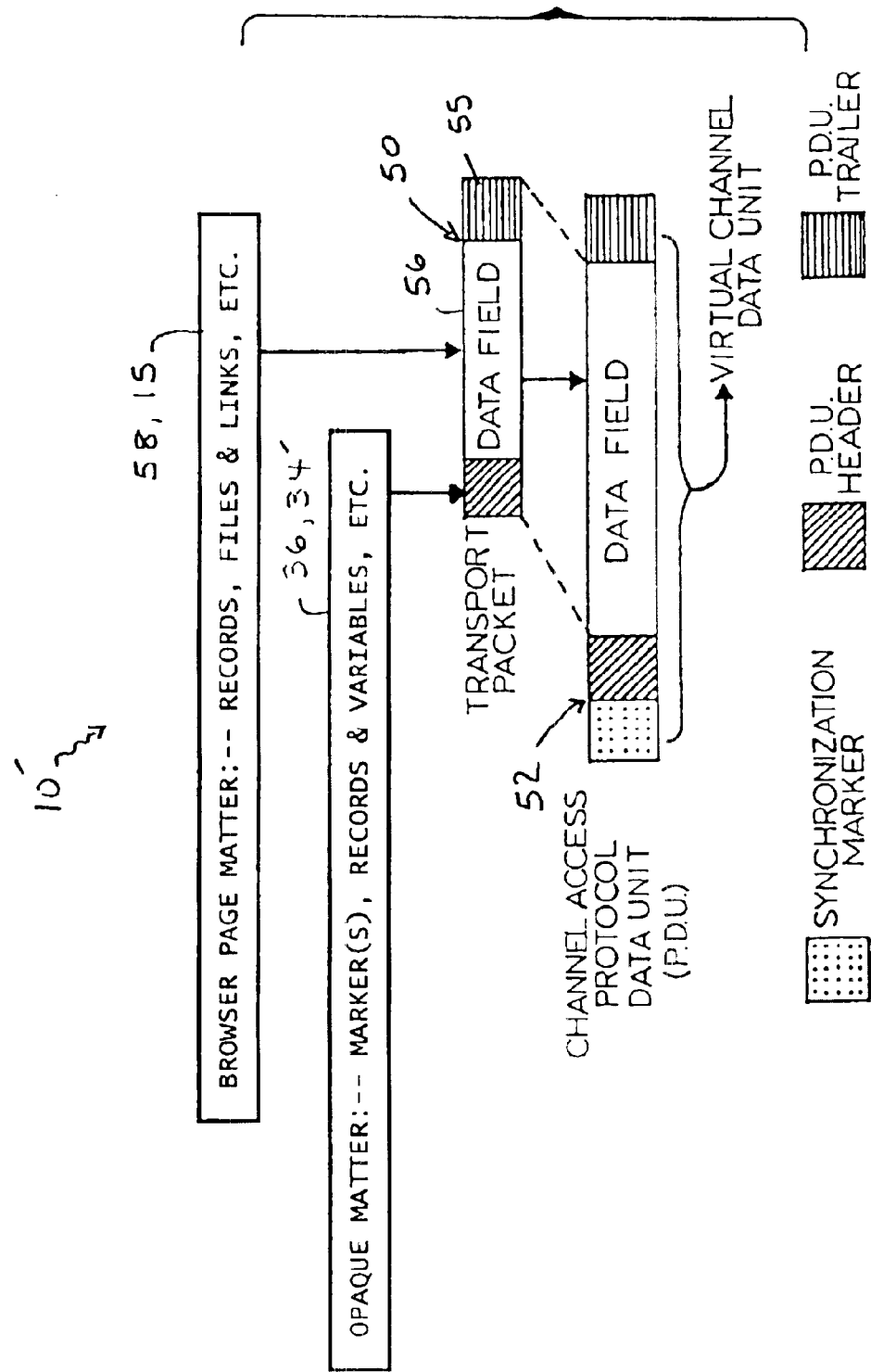
FIG. 3 is a diagram illustrating the arrangements of transport packets for web communications in accordance with a channel access protocol, wherein the given transport packet is partitioned among a main data field as well as various header and trailer fields in order to depict the alternative locations of where in a given transport packet that the variable "C" may be transported.

A cookie is actually an additional command line in an HTTP header ("Hypertext Transfer Protocol" header). Such an additional line consists of a text-only string that gets entered into the memory of a browser. FIG. 3 shows a transport packet 50 as for transporting data between communicators on a given channel of communication. As shown by FIG. 3, digital message data is organized, before transmission, into individual protocol data units 52. It is assumed that the message data exists as a relatively large block of data, at least of a size that is too large for transmission in a single packet 50 or 52. Therefore, the given block of data is organized first as a file, and then the overall data block or file is broken into manageable transport packets 50. At the destination, the block or file is reconstructed by an end-to-end piecing together of the packets 50. For actual transmission across the transmission channel, a channel packet can be used 52. The channel packet 52 may multiplex several transport packets 50 from several message sources together for efficient transport. It is common for the channel packets 52 to be sent at regular intervals to maintain transmission synchronization. When this is done, fill packets are used to keep the channel active if there is no actual data 50 to be sent. The packet 50's header will then have a special code to indicate that the packet 50 is a fill packet and thus there is no data to process.

The general packet 52 format comprises a header 54 that includes reconstruction and addressing information, and, following the header 54, a main data field 56. The packet 52 may end with a trailer 55 comprising error-checking codes or other administrative information. The addressing information in the packet 50 includes both destination information as well as message-source identification. Other information included in the header 54 might be a size parameter to specify the length of the main data field 56. For processing at the destination, the channel packet 52 usually begins with a synchronization marker.

So again, the transport packet 50 comprises a main field 56 for carrying the main message, which in the case of a web site might comprise pieces of web page matter. The transport packet 50 can also comprises a header 54 and an optional trailer 55 (if any). The transport packet 50 is likely nested in one or more superior packets 52 in a string with other diverse transport packets (not shown). The superior layer(s) of packets 52 might contain address or destination information in their headers (or error-checking and administrative information in their trailers, if any).

Hence, given that, cookies 36 comprise an additional line of text string in an HTTP header 54. A cookie's format is governed by a certain industry specification (eg., RFC 2109). The text string might contain the domain name of the server domain, the path, the lifetime of the cookie, the value of a variable that is set by the web site, and a security parameter. If the lifetime of the variable is longer than the user spends at that site, then the cookie is saved to file for future reference. The origin of the name "cookie" might be what Netscape's client product division purports: "A cookie is a well-known computer science term that is used when describing an opaque piece of data held by an intermediary; . . . it's just not a well-known term outside of computer science circles." P. Bonner, Builder.com (Nov. 18, 1997). Cookies are usually run from CGI scripts, but they can also be set or read by, eg., JAVASCRIPT®. So once again, a cookie is set by a command line in the header of a transmitted HTML document, which commands the browser to set a cookie of a certain name or value. An example of such an additional line might be:

Content-type: text/html
Set-Cookie: Crockett=David; path=/; expires Fri., Oct. 26, 2001; 23:00:00 GMT Here, the omission of the "secure" parameter results in default to the value "false." An example of an actual cookie set in the browser of a user having INTERNET EXPLORER 5.0®, as found in the "C:\WINDOWS\Cookies" folder, may appear as follows:

lastHereOn
942246350950
www.cookiecentral.com/
0
64690944
29317811
329453664
29305741
*

This cookie is from "www.cookiecentral.com," which is sort of a public service FAQ site about cookies. This cookie file can be opened by any simple text editor (eg., NOTEPAD®). The only information that a user can get off the cookie is identity, usually given by the first couple of lines. Cookies may recite a title and/or give a domain name, as well as other numbers usually in four (4) lines that are values and variables. But these cannot be of any information unless the user knows the script which set the cookie. Alternatively, the contents of a cookie can also be encrypted. It is also possible to have multiple cookies stored in one file. For example, the head-count and name on the above "www-.cookiecentral.com" example are stored as separate cookies on one file.

The cookie can be set by either the server or the browser, the determining factor is the language used to create the cookie. Once created, the cookie should flow easily from browser to server and back via the HTTP headers.

There are several limits imposed on cookie creation. These limits are partially imposed by HTTP and partially by other factors such as perhaps whether the browser is NETSCAPE® or INTERNET EXPLORER® and so on. A server cannot set a cookie for domains other than that (or those) the server resides in. The cookie must be no more than 4K in size (eg., the foregoing example of a double-cookie from "www.cookiecentral.com" is stored in one file measuring a mere 88 bytes of the available 4,096 byte allotment). For NETSCAPE®, domains can only set a maximum of 20 cookies on each specific client. This does not mean the true Internet domain but instead the domain specified. Hence ".server.com" can set 20 cookies and "www.server.com" can set an additional 20 cookies. This is allowed. Otherwise the least recently used cookie past 20 is deleted.

The main limit on retrieving cookies is that the a server can only retrieve cookies that are valid for that domain. This is mainly governed on the browser side, as browsers know the URL that they are accessing, and only transmit cookies for that domain across the connection. For the most part, the retrieval of a cookie does not actually require reading the HTTP cookie:header. Most languages read the header for the server and make it available through a variable or object. For example, to retrieve a cookie with JAVASCRIPT®, a server uses an object "document.cookie," which provides access to the valid name-value pairs for that document as separated by semi-colons, eg., "crockett=david; . . . " Needless to say, for a server to detect if a cookie is accepted, the cookie needs to be set on one HTTP connection and read back on another.

Many server Masters use the cookie variables to point to a database on the server where all the relevant variables are maintained. The process 10 in accordance with the invention prefers the opposite to this (but see FIGS. 4 and 5). With reference back to FIG. 1, whereas indeed one copy $34_B$ of the $S_0$-edition $32_0$ of the record 32 is maintained on the server database, at least one other copy 34' of the $S_0$-edition $32_0$ of the record 32 is transported via the cookie 36 for setting in the user 22's browser. The limits on this practice are that a cookie is limited in size to 4K, and the given browser may limit the number of cookies from one site to about 20 or so.

Hence because of this limited size, the server 21 may not be able to send a complete copy 34' of the full $S_0$-edition $32_0$ in the cookie 36 or cookies utilized for this purpose, but only an abbreviated copy. Nevertheless, the comparison routines shown by FIG. 2 may operate comparably as well with abbreviated copies rather than full copies or even, as suggested previously in connection with an administrative-checking token, marker or text string, a count-and-sum word variable.

An alternative way of practicing the process 10 in accordance with the invention involves the following. A customer account with a specialized service bureau might additionally entail the service bureau downloading specialized software add-on packages. As these parties are private parties, they might agree to vary the standardized cookie specification RFC 2109 for their own purposes. Such add-on packages can include enhancements to the browser so as to allow larger cookies or greater number of cookies in cases of connections between browsers enhanced by the add-ons and the service bureau domain only. Indeed, the service bureau can dump the cookie paradigm and create its own manner of setting and transporting opaque data strings for not only saving on the user's machine but also getting back at relevant times by connections from the user.

Figure 4:
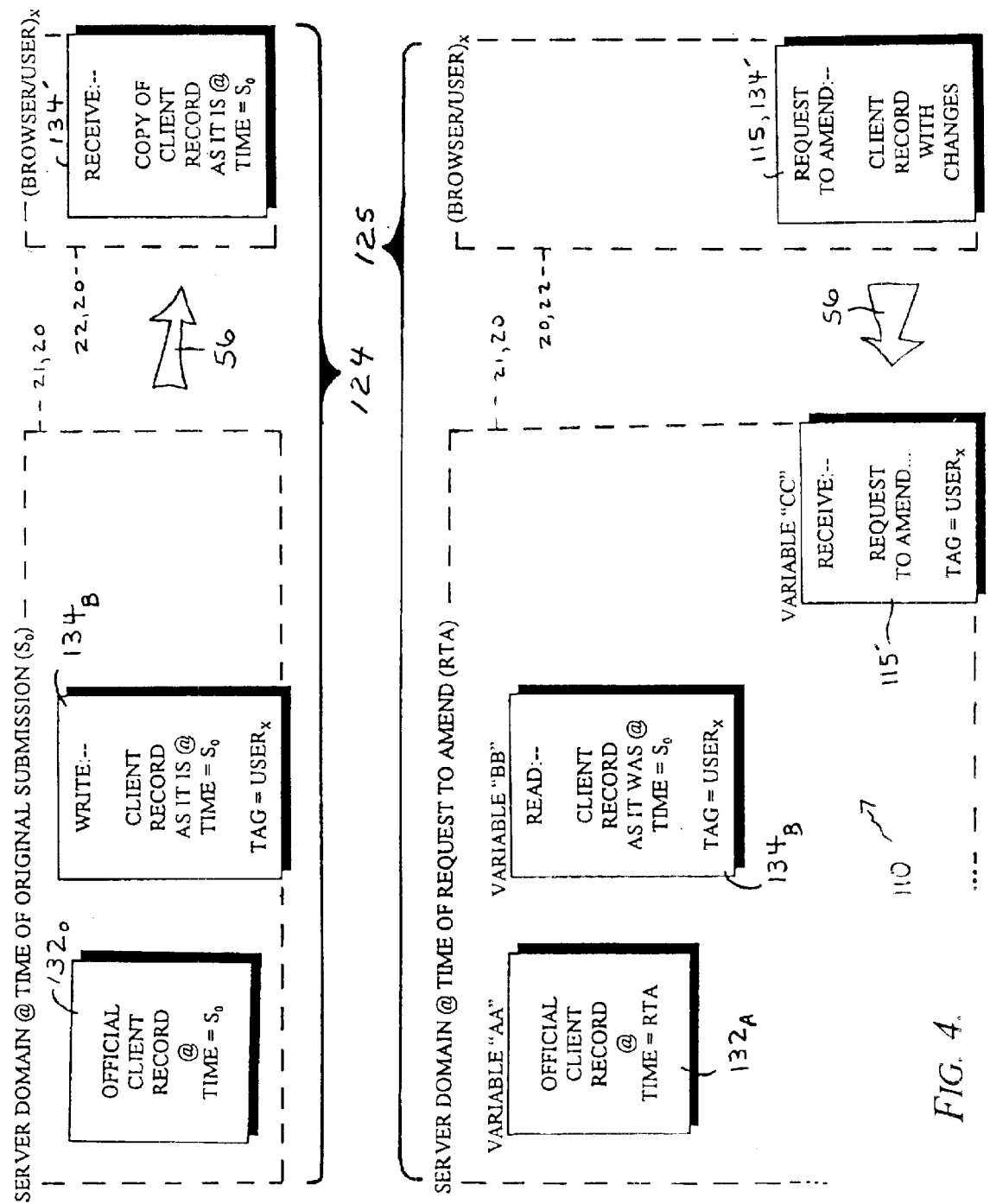
FIG. 4 is a schematic block diagram of an alternate mode of the administrative process in accordance with the invention for the administration over server-administrated client records in a stateless protocol.
Figure 5:
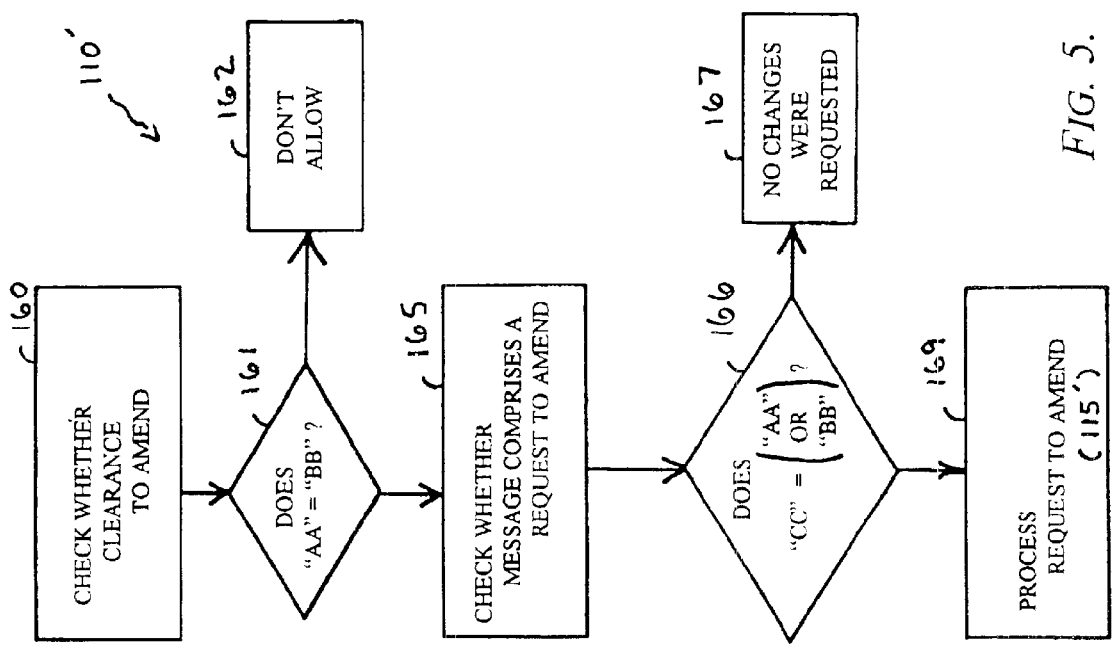
FIG. 5 is a flow chart thereof which references the variables "AA," "BB" and "CC" that are shown by FIG. 4.

FIGS. 4 and 5 illustrate an alternate mode 110 of the administrative process in accordance with the invention.

FIG. 4 shows two separate instances of connection 124 and 125 between the server domain 21 and user 22. The connection 124 of the upper set of dashed-line blocks 21 and 22 comprises a submission (eg., 124) from the server 21 to the user 22 occurring at "time of original submission," or else "$S_0$." The connection 125 of the lower set of dashed-line blocks 21 and 22 comprises the transmission (eg., 125) from the user 22 to the server 21 of the "Request to Amend" 115 the record 132 within the server domain 21, as occurring at "time of request to amend," or eg., "time=RTA."

In FIG. 4, it is assumed as matter of proximate history that the user/member 22, "user$_x$," has established some previous connection with the server 21, and has some way signaled the server 21 its intentions to change the record 132. So as an original matter, the server 21 initiates the process 110 in accordance with the invention by creating one or more sets of copies 134 of the record 132 in order to preserve the edition $132_0$ of the record 132 as it exists at the time of original submission, or $S_0$. One copy $134_B$ of the $S_0$-edition $132_0$ of the record is written to memory administrated over or accessible to the server. Optionally, another copy 134' of the $S_0$-edition $132_0$ might be created and submitted to the user 22. This at least one other copy 134', if sent (it being optional), is submitted as web page matter 156, and not as "transparent" and/or "opaque" matter as discussed above in connection with cookies 36/36'. The use of cookies by the FIGS. 4 and 5 mode 110 of the invention is limited to routine user identification.

In accordance with inventive administrative process 110, the conversation between the server 21 and user 22 terminating with connection 124 remains in suspension until the user 22 next contacts the server, as by connection 125. Presumptively, the user 22 submits the "request to amend" 115 to the server 21. In FIG. 4, this successive connection 125 is shown by the lower set of dashed-line boxes 21 and 22. The time of this connection 125 is designated as the time of the "request to amend," or "RTA." At this time, the server 21 is in possession of at least three (3) relevant quantities $132_A$, $134_B$ and 115'. The server 21 has on hand the then current edition of the Official client record $132_A$ (designated variable "AA"), the copy $134_B$ of the $S_0$-edition $132_0$ of the client record 132 as retrieved from memory administrated over or accessible to the server (designated variable "BB"), and changed copy of the record 134' possibly returned with the "request to amend" 115' (eg., variable "CC").

FIG. 5 shows the algorithm 110' in accordance with inventive administrative process 110 of FIG. 4. As a preliminary matter, this process 110 does not check the integrity of the connections 124 and 125 (eg., as shown by box 40 in FIG. 2). Hence this process 110 leaves that sub-part of the FIGS. 1 and 2 process 10 to implementation by other ways which are not part of this process 110. This process 110 begins originally with determining whether there is clearance to grant the "Request to Amend" 115' (eg., box 160).

In this primary comparison (eg., box 161), the process 110 compares whether the copy $134_B$ of $S_0$-edition $132_0$ read from the memory administrated over or accessible to the server and corresponding to the tag or identification of "user$_x$," (perhaps the tag or ID is returned by the user 22's cookie, not depicted in FIG. 4)—eg., variable BB—matches the then current edition $132_A$ of the official client record (eg., variable AA). This primary comparison 161 seeks to determine if the saved and tagged copy $134_B$ of the $S_0$-edition of the client record 132 (which is, more accurately, variable BB) matches the then current edition $132_A$ (ie., variable AA). If no match (eg., box 162), then what has likely happened is that another member of the client group has intervened and changed the record ahead of the given user 22 (eg., "user$_x$") in FIG. 4.

This administrative process 110 like process 10 of FIGS. 1 and 2, leaves the record 132 unlocked. Hence in some cases one member of the relevant client group is going to change the record 132 ahead of the another member. The server 21 will inform all users of such intervening changes but won't process the immediate "Request to Amend" 115' in cases where "AA" does not match "BB" (eg., box 162).

Thus, in cases of no match 162, the server 21 might step through a given instruction set such as:—● informing the FIG. 4 user 22 of non-match 162, and ● perhaps polling the user 22 if the user 22 wishes to re-study the changed record $132_A$ to decide if to re-submit an updated request to amend (no updated request is shown). If the user 22 would chose to do so, then the inventive administrative process 110 would restart from the beginning. That is, the process 110 would restart from the top of FIG. 4 by saving in memory on the server side the then current version of the official client record (eg., $132_A$), which would be utilized for a further instance of administrative checking as shown by FIG. 5, if and when the user 22 ever sends a successive "request to amend."

On the other hand, in cases of a match (eg., box 165 in FIG. 5), the process 110 determines if the submitted message in communication 115' comprises a technical "Request to Amend." This step is optional and was omitted in the FIG. 2 mode of the process 10 in accordance with the invention. But here in FIG. 5, the process 110 checks 166 if the returned copy 134' of the client record matches (eg., variable "CC" in FIG. 4) matches the current edition $132_A$—ie., variable AA—, or alternatively the saved and tagged copy $134_B$ of the $S_0$-edition of the client record 132 (ie., variable BB). It does not matter whether "CC" is compared to "AA" or "BB," it previously being established in box 161 that "AA" and "BB" match. If there is a match, then evidently no changes were submitted as shown by box 167. If on the other hand there is no match, then the "request to amend" 115' is simply processed.

Figure 8:
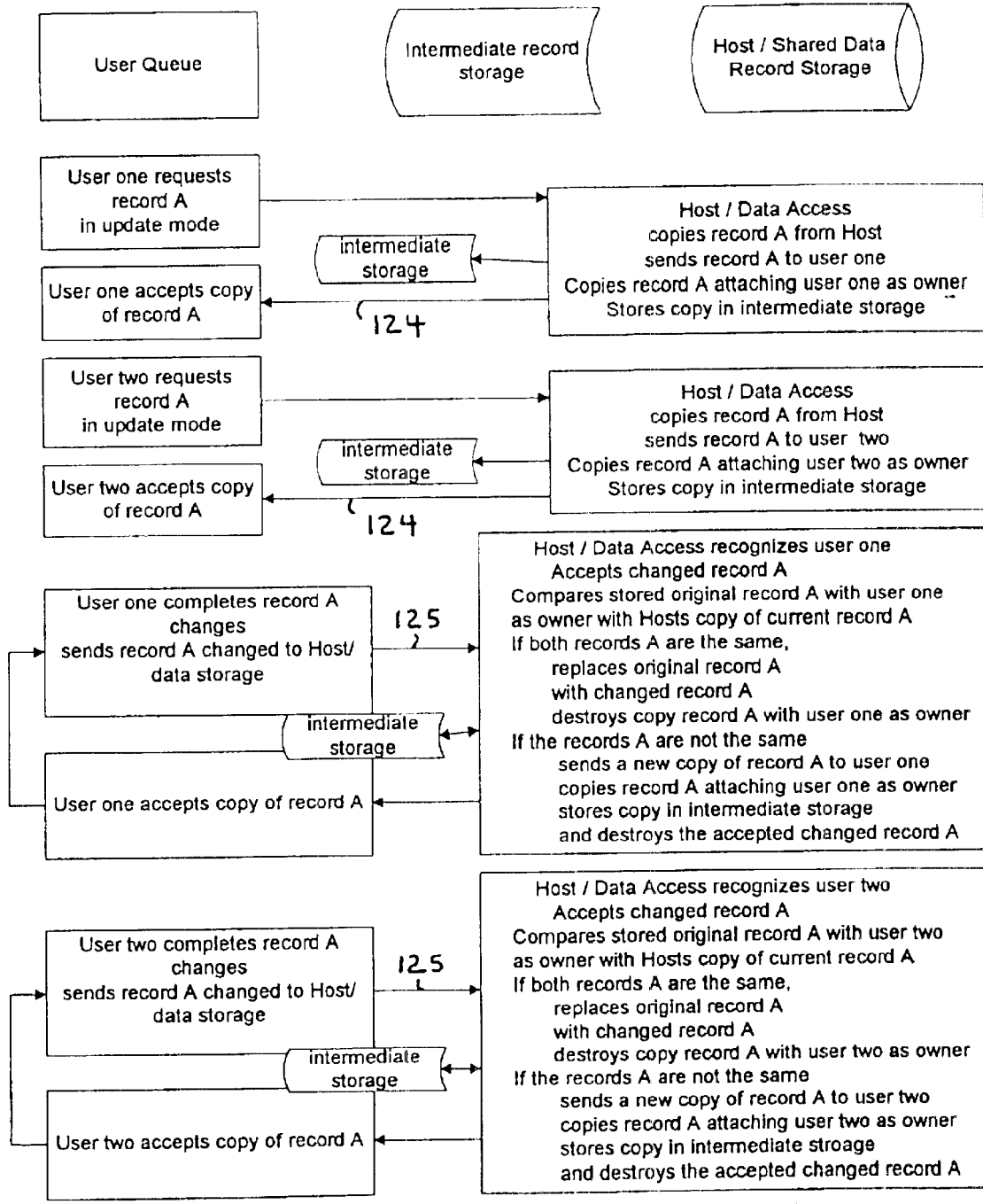
FIG. 8 provides an alternative depiction of the administrative process in accordance with the invention as shown by FIGS. 4 and 5, wherein FIG. 8 isolates on the server and the activity blocks shown by FIG. 8 give an alternative view of what processes the server algorithm might step through to achieve the objects of the invention; and, FIG. 9 is comparable to FIG. 8 except providing an alternative depiction of the administrative process in accordance with the invention as shown by FIGS. 6 and 7, wherein the activity blocks shown by FIG. 9 give an alternative view of what processes the server algorithm might step through to achieve the objects of the invention.

FIG. 8 provides an alternative depiction of the administrative process 110 in accordance with the invention as shown by FIGS. 4 and 5. FIG. 8 isolates on the server. The activity blocks shown in FIG. 8 give an alternative view of what processes the server algorithm might step through to achieve the objects of the invention.

Figure 6:
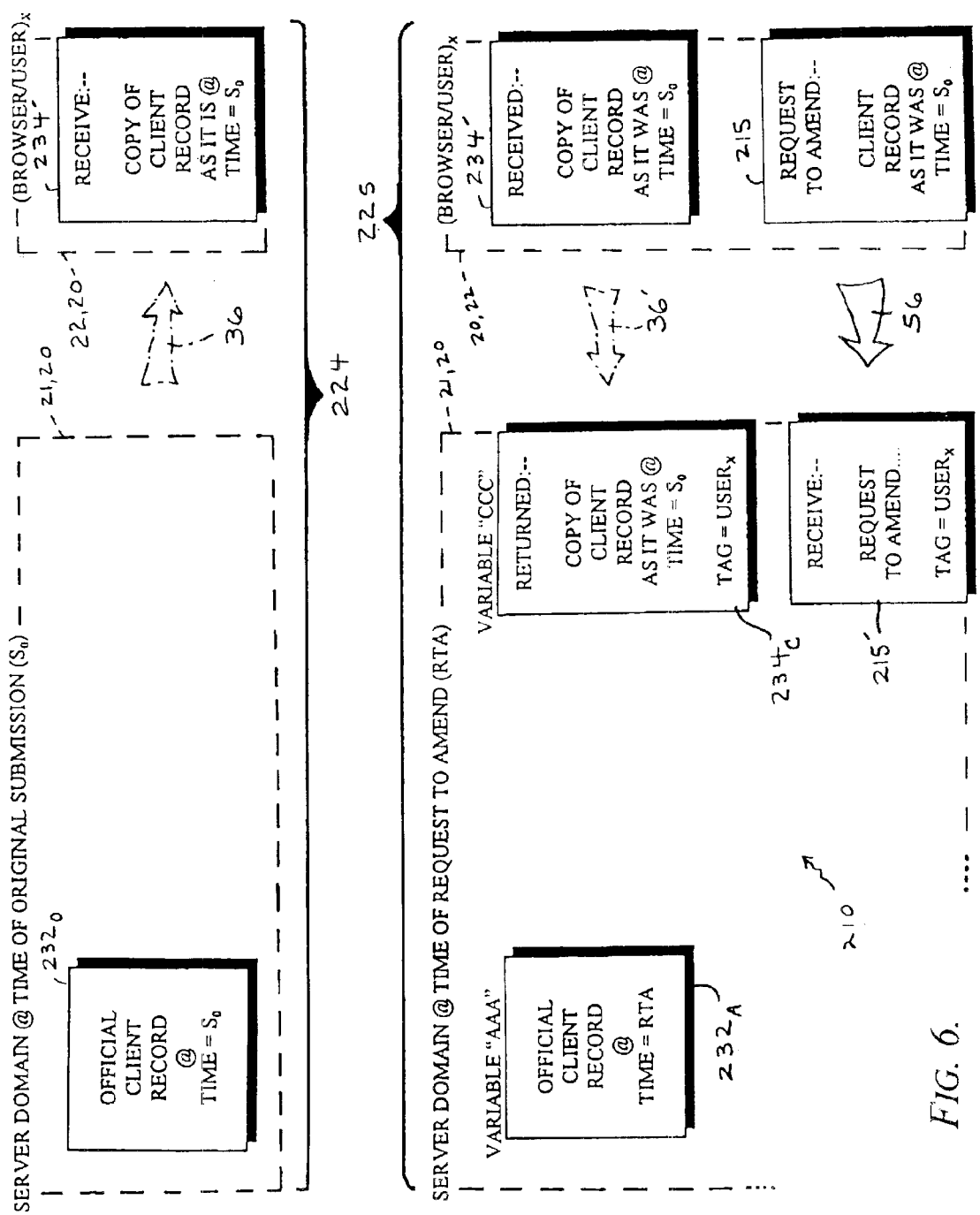
FIG. 6 is a schematic block diagram of still another mode of the administrative process in accordance with the invention for the administration over server-administrated client records in a stateless protocol.
Figure 7:
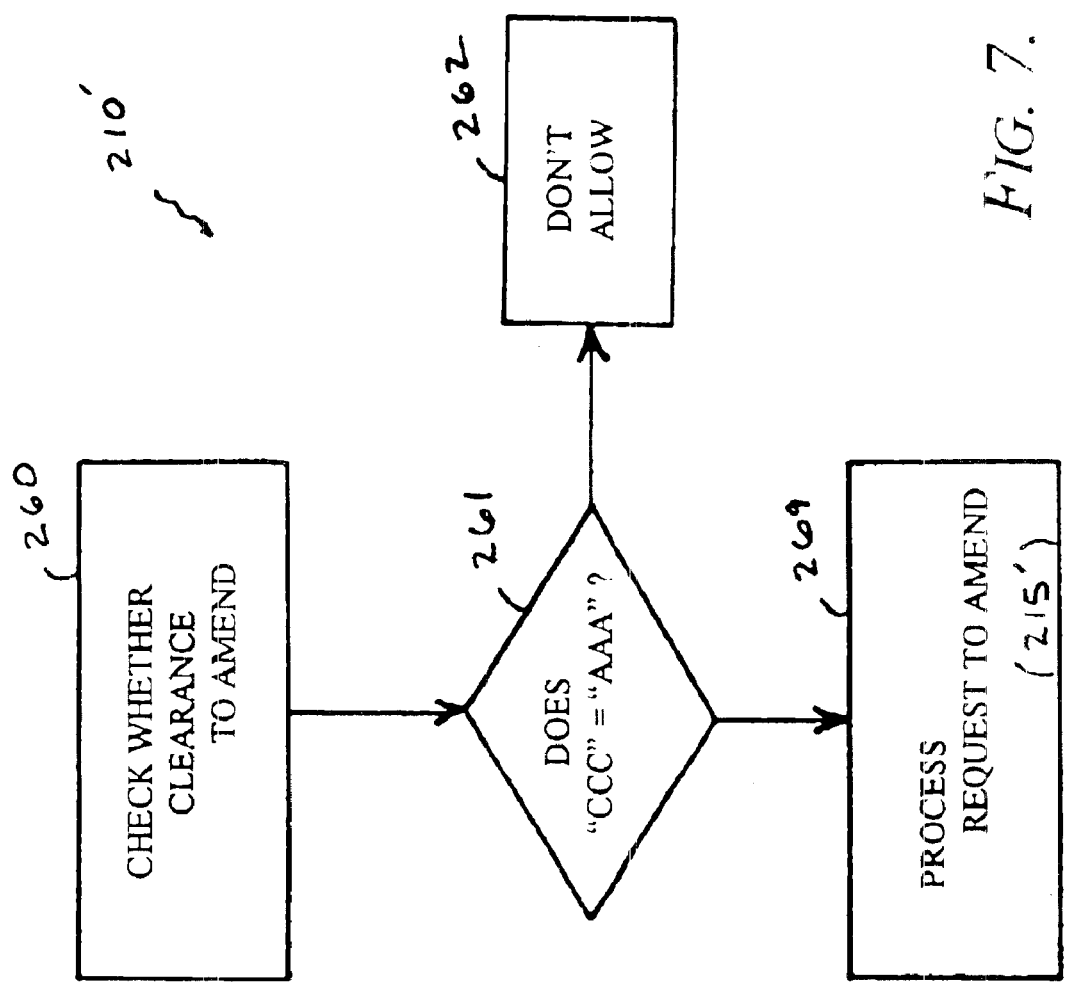
FIG. 7 is a flow chart thereof which references the variables "AAA" and "CCC" that are shown by FIG. 6.
Figure 9:
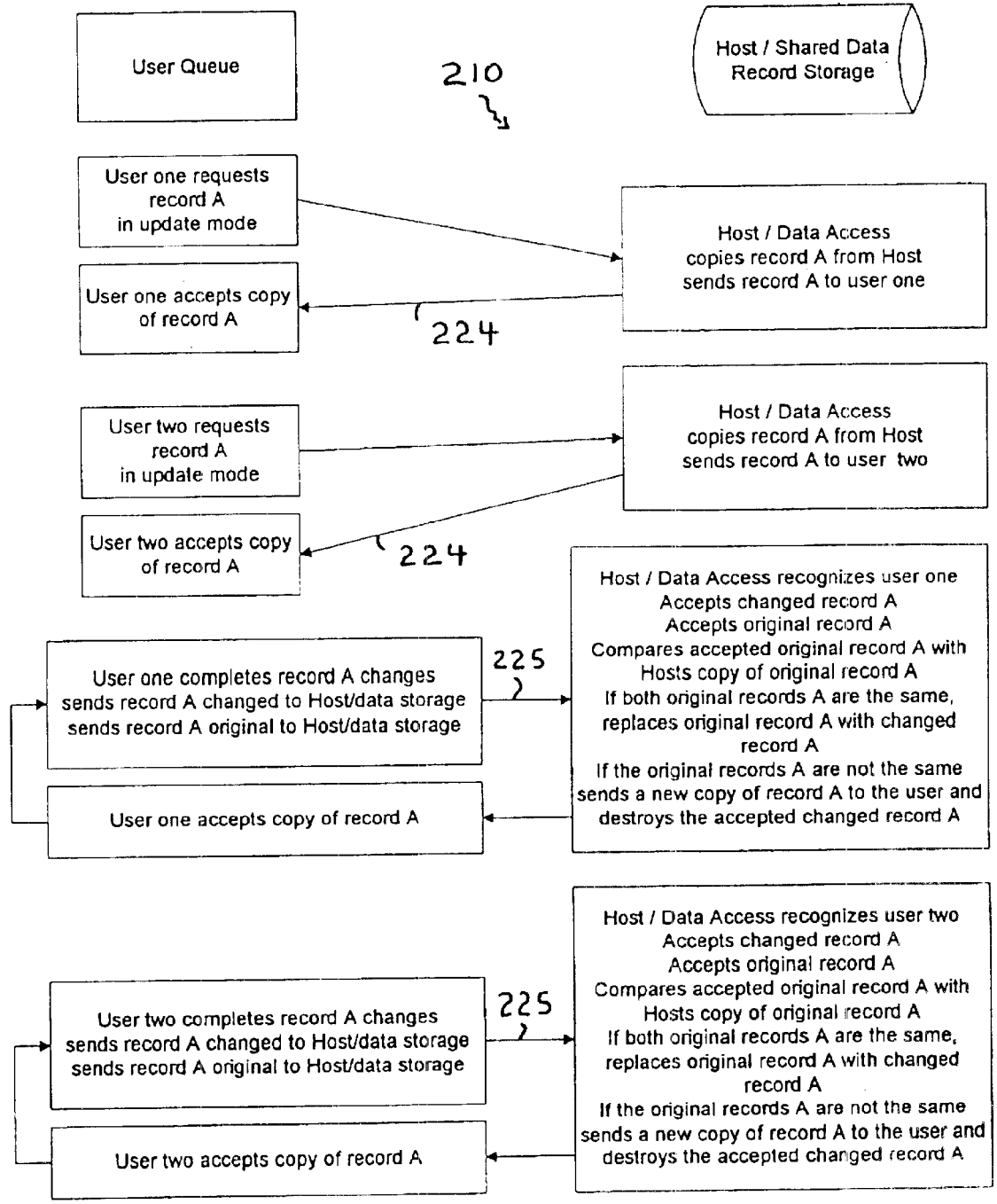

FIGS. 6 and 7 as well as FIG. 9 illustrate still another mode 210 of the administrative process in accordance with the invention.

FIG. 6 shows two separate instances of connection 224 and 225 between the server domain 21 and user 22. The connection 224 of the upper set of dashed-line blocks 21 and 22 comprises a submission (eg., 224) from the server 21 to the user 22 occurring at "time of original submission," or eg., "$S_0$." The connection 225 of the lower set of dashed-line blocks 21 and 22 comprises transmission (eg., 225) from the user 22 to the server 21 of the "Request to Amend" 215 a given record 232 within the server domain 21. This second connection 225 occurs at later time, "time of request to amend," or else "time RTA."

In FIG. 6, it is assumed as matter of proximate history that the user/member 22, "$user_x$," of its relevant client group has established some previous connection with the server 21, and has some way signaled the server 21 of its intentions to change the record 232. So as an original matter, the server 21 initiates the process 210 in accordance with the invention by creating various sets of copies 234 of the record 232 in order to preserve the edition $232_0$ of the record 232 as it exists at the time of original submission, or $S_0$. At least one copy 34' of the $S_0$-edition $32_0$ is created and submitted to the user 22 preferably in a "transparent" and/or "opaque" way 36 to the user, such as by a cookie 236.

Thus FIG. 6 may be interpreted as showing that the server 21 at time $S_0$ causes the setting of one or more cookies 236 with the user's browser 22. Presumably, the cookie or cookies 236 contain(s) a copy 234' of the $S_0$-edition $232_0$ of the client record 232. In other words, the at least other copy 234' is saved with the user's browser 22 and/or machine, as preferably transported there by means of a cookie 236. Indeed, the server 21 may create and serve an additional copy (not shown) of the $S_0$-edition $232_0$ of the client record 232, it being accessible to the user 22 in the format of the main web page being submitted to the user 22 (again, this is not shown).

In accordance with inventive administrative process 210, the conversation between the server 21 and user 22 terminating with connection 224 remains in suspension until the user 22 next contacts the server, as by connection 225. Presumptively, the user 22 submits a "request to amend" 215 to the server 21. This successive connection 225 is shown by the lower set of dashed-line boxes 21 and 22. The time of this connection 225 is designated as the time of the "request to amend," or "RTA." At this time, the server 21 is in possession of at least three (3) relevant quantities $232_A$, $234_C$ and 215'. That is, the server 21 has on hand the then current edition $232_A$ of the Official client record $232_A$ (designated variable "AAA"), the copy $234_C$ of the $S_0$-edition $232_0$ of the client record 232 as returned in the user 22's cookie 236' (designated variable "CCC"). The third quantity is the received "request to amend" 215' itself.

FIG. 7 shows the algorithm 210' in accordance with this other mode of the inventive administrative process 210. This process 210' moves immediately into determining whether there is clearance to grant the "Request to Amend" 215' (eg., box 260).

In this comparison (eg., box 261), the process 210 compares whether the copy $234_C$ of $S_0$-edition $232_0$ returned by the user's cookie 236'(eg., variable CCC) matches the then current edition $232_A$ of the official client record (eg., variable AAA). In other words, this comparison 261 seeks to determine if the returned copy $234_C$ of the $S_0$-edition of the client record 232 (variable "CCC") matches the then current edition $232_A$ (ie., variable "AAA"). If no match (eg., box 262), than what has likely happened is that another member of the client group has intervened and changed the record ahead of the given user 22 in FIG. 6 (eg., "$user_x$"). Since the process 210 leaves the record 232 unlocked, it is entirely foreseeable that in some cases one member of the relevant client group is going to change the record 232 ahead of the another member. Whereas such other member no doubt may be surprised by that fact, the server 21 nevertheless will inform that such other member.

Preferably, in cases of no match 262, the server 21 steps through a given instruction set such as:—● informing the FIG. 6 user 22 of non-match 262, and ● perhaps polling the user 22 if the user 22 wishes to re-study the changed record $232_A$ to decide if to re-submit an updated request to amend (no updated request is shown). If the user 22 would chose to do so, then the inventive administrative process 210 would restart from the beginning. That is, the process 210 would restart from the top of FIG. 6 by sending a copy of the then current version of the official client record in a cookie, which will be utilized for a further instance of administrative checking as shown by FIG. 7, if and when the user ever sends a successive "request to amend." On the other hand, in cases of a match (eg., box 269 in FIG. 7), the "request to amend" 15' is simply processed.

FIG. 9 provides an alternative depiction of the administrative process 210 in accordance with the invention as shown by FIGS. 6 and 7. FIG. 9 isolates on the server. The activity blocks shown in FIG. 9 give an alternative view of what processes the server algorithm might step through to achieve the objects of the invention.

The bandwidth for any given mode 10, 110 or 210, where practicable, may be reduced by encrypting the portions of the transmitted data such as count-and-sum word values(s) and the like. For example, in terms of the mode 10 of FIGS. 1 and 2, encryption might be utilized as follows. The server 21 would encrypt at time $S_0$ the copy 34' of the $S_0$-edition $32_0$ of the client record 32 that is sent to the user 22's browser in the given opaque or transparent format 36 (eg., a cookie). By encryption, that is, the copy 34' is reduced down to a substantially unique representation in say 64-bits or the like (64-bits was recently relatively state of the art). Such 64-bit encryption of the copy 34' is passed back and forth between the server 21 and user 22.

The server has the option of treating the copy $34_B$ of the $S_0$-edition $32_0$ in one of several ways, or at least two ways. That is, at time $S_0$ the server 21 might save the encrypted $S_0$-edition $32_0$ that is sent in place of full copy 34' to the user 22, as the on-site stored edition of copy $34_B$. Alternatively, at time $S_0$ the server 21 might save the full format copy $34_B$ in memory administrated over or accessible to the server domain. But at time RTA, for the comparison 41 as shown by FIG. 41, the server should preferably have encrypted the copy $34^B$ by the same encryption function. Hence, at time RTA, variable C is encrypted (since time $S_0$), as is variable B, either at time $S_0$, time=RTA, or sometime. With both variables B and C be comparably encrypted, variables B and C have the appropriate value format which will allow testing for identity as by bit-by-bit, count-and-sum word value(s), or algorithms executed on parts of the variables and so on.

If the encrypted variable B matches encrypted variable C in comparison box 45 (FIG. 2), the succeeding comparison involving variable A may likewise include the encryption (by the given encryption function) of the then-current edition of the Official client record $32_A$. However, comparison box 46 won't require encryption of the then-current edition of the Official client record $32_A$ (eg., variable "A"). If the comparison in box 46 is between variables A and C, variable A should be converted to encrypted format. If the comparison 46 is chosen between variables A and B, and if variable B that is copy $34_B$ had been saved in full format, the comparison box 46 can operate on full format versions of variables A and B. It can be appreciated that encryption affords the mode 10 of the invention with an opportunity to reduce bandwidth in the communications 24 and 25 between the server 21 and user 22.

Accordingly, the invention having been disclosed in connection with the foregoing variations and examples, additional variations will now be apparent to persons skilled in the art. Parts of the description uses terms for a computer network such as server, client, user, browser, packets, headers and cookies and the like, consistent with the manner commonly employed by those skilled in the art to convey the substance of their work to others skilled in the art. As well understood by those skilled in the art, several of these entities might take the form of electrical, magnetic, or optical signals capable of being stored, transferred, combined, and otherwise manipulated through mechanical and electrical components of a computer-implemented system. The term "system" (ie., computer~) includes general purpose as well as special purpose data processing machines and the like, that are standalone, adjunct or embedded. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A system for administrating over changes to a record shared by a plurality of users authorized to do so, comprising:
    a resource to officiate over an official version of the record and to communicate with the plurality of users over a medium for non-persistent communications;
    in response to a request of a given user, a communication by the resource sending a use copy of the official version as well as a transparent or opaque copy;
    in consequence of a return by the given user of an original edition of the sent copy as well as a request to effect given changes, the resource comparing the returned transparent or opaque copy to the official version so if in case of a match the resource effects the given changes to the official version, else not.

2. The system of claim 1 wherein the request to effect given changes comprises a changed edition of the use copy and the resource effecting the given changes to the official version comprises replacing the official version with the changed edition.

3. The system of claim 1 wherein official version of the record is stored on storage devices administrated over or accessible to the resource.

4. The system of claim 1 wherein the system activity of the resource comparing for a match comprises any of bit-by-bit comparison in full or in part, or a count-and-sum word comparison, or another algorithm for substantial identity.

5. The system of claim 1 wherein the system activity of else not further comprises informing the given user of the failure to effect the given changes.

6. The system of claim 1 wherein the resource comprises a server domain on the Internet global computer information network.

7. The system of claim 1 wherein the medium for non-persistent communications includes the Internet global computer information network.

8. A method for administrating over changes to a record shared by a plurality of users authorized to do so, comprising the steps of:
    providing a resource to officiate over an official version of the record and to communicate with the plurality of users over a medium for non-persistent communications;
    in response to a request of a given user, the resource sending the given user a use copy of the official version as well as a transparent or opaque copy;
    the given user accepting the use and transparent or opaque copies of the official version and thereafter applying to change the official version by returning the transparent or opaque copy of the official version as well as a request to effect changes;
    the resource accepting the returned transparent or opaque copy of the official version as well as the request to effect changes and comparing the returned transparent or opaque copy to the official version so if in case of a match the resource effects the given changes to the official version, else not.

9. The method of claim 8 wherein accepting said transparent or opaque copy of the official version comprises the given user accepting a cookie.

10. The method of claim 8 wherein said resource converts said transparent or opaque copy of the official version into a changed format before sending, which changed format can include any of count-and-sum word values or encrypted or abbreviated formats.

11. The method of claim 10 wherein the step of the resource comparing the returned transparent or opaque copy of the official version comprises either the resource restoring the returned transparent or opaque copy of the official version from the changed format or converting a copy of the official version into the changed format.

12. The method of claim 8 wherein the request to effect given changes comprises a changed edition of the use copy and the resource effecting the given changes to the official version comprises replacing the official version with the changed edition.

13. The method of claim 8 wherein the step of else not further comprises informing the given user of the failure to effect the given changes.

* * * * *